United States Patent
Chevar et al.

(10) Patent No.: US 12,304,572 B2
(45) Date of Patent: May 20, 2025

(54) DRAG REDUCING DEVICE FOR A MOTOR VEHICLE

(71) Applicant: Volvo Truck Corporation, Gothenburg (SE)

(72) Inventors: Udayesh Chevar, Kerala (IN); Anumodh Rajan, Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 263 days.

(21) Appl. No.: 17/913,200

(22) PCT Filed: Feb. 22, 2021

(86) PCT No.: PCT/EP2021/054351
§ 371 (c)(1),
(2) Date: Sep. 21, 2022

(87) PCT Pub. No.: WO2021/197712
PCT Pub. Date: Oct. 7, 2021

(65) Prior Publication Data
US 2023/0109675 A1    Apr. 13, 2023

(30) Foreign Application Priority Data

Mar. 28, 2020   (IN) .............................. 202041013739

(51) Int. Cl.
*B62D 35/02* (2006.01)
*B62D 25/16* (2006.01)
(Continued)

(52) U.S. Cl.
CPC .............. *B62D 35/02* (2013.01); *B62D 25/16* (2013.01); *B62D 25/186* (2013.01); *B62D 35/001* (2013.01)

(58) Field of Classification Search
CPC ...... B62D 35/02; B62D 25/16; B62D 25/186; B62D 35/001; B62D 25/182; B62D 35/00; Y02T 10/82; Y02T 10/88
See application file for complete search history.

(56) References Cited

U.S. PATENT DOCUMENTS

| 2,017,227 A | 10/1935 | Barnhart |
| 5,975,548 A | 11/1999 | Galli et al. |
(Continued)

FOREIGN PATENT DOCUMENTS

| CN | 108349550 A | 7/2018 |
| DE | 102010047311 A1 * | 4/2011 | ............. B62D 25/16 |
(Continued)

OTHER PUBLICATIONS

WO-2016197161-A1 includes English translation (Year: 2016).*
(Continued)

*Primary Examiner* — Lori Lyjak
(74) *Attorney, Agent, or Firm* — Withrow & Terranova, PLLC

(57) ABSTRACT

A drag reducing device for a motor vehicle having a vehicle body and at least one substantially semi-circular wheel-well for receiving a wheel capable of vertical and rotational movements with regards to the vehicle body, the vehicle comprising unsprung masses associated with the at least one wheel; wherein the drag reducing device comprises a wheel-well cover configured to cover at least a portion of the wheel and of the wheel-well, a pivotal linkage pivotally connecting the wheel-well cover to the vehicle body, and a sliding linkage slidingly connecting the wheel-well cover to an element of the unsprung masses with one degree of freedom oriented in the vertical movement of the at least one wheel.

14 Claims, 4 Drawing Sheets

(51) Int. Cl.
    *B62D 25/18*     (2006.01)
    *B62D 35/00*     (2006.01)

(56) References Cited

U.S. PATENT DOCUMENTS

| | | | | |
|---|---|---|---|---|
| 6,007,102 | A * | 12/1999 | Helmus | B62D 25/182 |
| | | | | 280/847 |
| 8,066,304 | B2 | 11/2011 | Ulgen | |
| 2010/0217490 | A1* | 8/2010 | Canfield | B62D 25/16 |
| | | | | 701/49 |
| 2012/0013113 | A1* | 1/2012 | Trenne | B62D 25/182 |
| | | | | 280/849 |
| 2013/0096781 | A1 | 4/2013 | Reichenbach et al. | |
| 2018/0257716 | A1 | 9/2018 | Haeseker et al. | |
| 2019/0210657 | A1* | 7/2019 | Gandhi | B62D 37/02 |
| 2019/0300069 | A1 | 10/2019 | Angelo | |

FOREIGN PATENT DOCUMENTS

| | | | | | |
|---|---|---|---|---|---|
| DE | 102012020669 | A1 * | 5/2013 | | B60B 7/00 |
| DE | 102015222174 | A1 * | 5/2017 | | B60B 7/00 |
| FR | 2848174 | A1 | 6/2004 | | |
| GB | 191100171 | A | 5/1911 | | |
| GB | 191405429 | A | 2/1915 | | |
| JP | S59153662 | A | 9/1984 | | |
| WO | WO-2013105943 | A1 * | 7/2013 | | B62D 25/182 |
| WO | 2016197161 | A1 | 12/2016 | | |

OTHER PUBLICATIONS

Examination Report for Indian Patent Application No. 202041013739, mailed Feb. 3, 2022, 5 pages.

International Search Report and Written Opinion for International Patent Application No. PCT/EP2021/054351, mailed May 11, 2021, 11 pages.

* cited by examiner

DRAG REDUCING DEVICE FOR A MOTOR VEHICLE

This application is a 35 USC 371 national phase filing of International Application No. PCT/EP2021/054351, filed Feb. 22, 2021, which claims the benefit of Indian Patent Application number 202041013739, filed Mar. 28, 2020, the disclosures of which are incorporated herein by reference in their entireties.

TECHNICAL FIELD

The invention relates to a drag reducing device for a motor vehicle and more particularly for a front wheel of a motor vehicle. The invention also concerns a motor vehicle, comprising such drag reducing device.

The invention can be applied in vehicles with wheels, including heavy-duty vehicles, such as trucks, buses and construction equipment. The invention will be described with respect to a front wheel of a vehicle, but may also be used in a rear wheel of a vehicle.

BACKGROUND

Improving vehicle efficiency is a constant objective of the road vehicle industry. One factor in an efficient design is the vehicle aerodynamic characteristics.

Improving aerodynamics is therefore one of the focuses in any transportation industry to reduce fuel (fossil or not) consumption and improve vehicle performance, comfort, safety, stability. A major objective of aerodynamic design of vehicles is to minimize drag. General rules are that a smooth shape is better than a rough one to improve air flow. This means that all gaps existing between vehicle body panels on the sides of a vehicle (right and left sides, but also top and bottom sides) should be minimized to remain as continuous as possible.

Conventionally, a motor vehicle comprises a vehicle body and several wheels. As illustrated in FIG. 1, the vehicle body of a motor vehicle (V) comprises a wheel arch 100 accommodating a wheel 102. The gap between the wheel-arch 100 and the wheel 102 is commonly known as wheel-well 106. The flow around the rotating wheels in contact with the ground has formed a major area of research due to the substantial influence they have on the aerodynamic performance of the vehicle. The front wheel area is where significant turbulence are created and subsequently transmitted downstream, directly negatively influencing the airflow on both sides of the vehicle, on the vehicle underbody, towards the rear wheels and over the vehicle rear side. Geometry of front wheel arches is difficult to manage due to the fact that when turning, the wheels exceed the overall width of the vehicle.

As a solution aiming at closing the wheel-arch, it is known to use a flexible flaps that close all gaps on the side, top and bottom of a vehicle wheel in order to improve the aerodynamic efficiency of a vehicle.

While systems for closing off front wheel-arches exist, they are not fully satisfactory. Indeed, they are not fully adapted to steering wheels or they do not fully improve aerodynamics.

SUMMARY

An object of the invention is to overcome the problem of reducing the disturbances caused by flow around rotating wheels in contact with the ground in order to improve the aerodynamic profile of a vehicle and to solve at least the previous problem of the prior art.

The object is achieved by a drag reducing device for a motor vehicle having a vehicle body and at least one substantially semi-circular wheel-well for receiving a wheel capable of vertical and rotational movements with regards to the vehicle body, said vehicle comprising unsprung masses associated with the at least one wheel;

Wherein the drag reducing device comprises a wheel-well cover configured to cover at least a portion of the wheel and of the wheel-well, a pivotal linkage pivotally connecting the wheel-well cover to the vehicle body, and a sliding linkage slidingly connecting the wheel-well cover to an element of unsprung masses with one degree of freedom oriented in the vertical movement of the said at least one wheel.

The drag reducing device is configured to cover the wheel-well of a motor vehicle.

The steering bracket is an orientation mechanism of the wheel-well cover, in order to turn the wheel-well cover with the wheel. Therefore, the drag reducing device is adapted to the turning of steering wheels, such as front steering wheels, during turns/cornering. The wheel-well cover can cover the entire wheel-well of steering wheels, such as front steering wheels. The wheel-well cover is configured to be adjusted in a manner dependent on the wheel.

The drag reducing device of the present invention enables to improve the aerodynamic profile of a vehicle in a simple manner. The said drag reducing device is easy to assemble as it has minimal parts and does not need much human effort.

Moreover, the drag reducing device enables to accommodate vertical motion of the motor vehicle. Vertical motion means a motion in a direction perpendicular to a surface on which a vehicle is traveling.

In the present description, vertical means in a direction perpendicular to a surface on which a vehicle is traveling.

According to one embodiment, the sliding linkage comprises a steering bracket configured to be mounted on the element of unsprung masses, perpendicular to a steering axis of the wheel, and two members attached to the wheel-well cover and configured to cooperate with the steering bracket.

According to one embodiment, the steering bracket comprises two longitudinal, each slot being provided with a pin slidably mounted therein along the longitudinal direction of the slot, wherein each pin is configured to cooperate with one member attached to the wheel-well cover allowing to transfer a steering input to the wheel-well cover.

According to one embodiment, each pin extends perpendicular to the steering bracket and each member attached to the wheel-well cover comprises a complementary shaped end in order to slide along the pin perpendicular to the steering bracket.

Each slot, pin and member attached to the wheel-well cover is a guiding means for the wheel-well cover. Each slot is a guiding rail for the corresponding pin.

According to one embodiment, each member attached to the wheel-well cover comprises a distal end with regard to the wheel well cover, wherein the distal end comprises a groove that allows each member attached to the wheel-well cover to slide over the pin perpendicular to the steering bracket.

According to one embodiment, the groove is a concave shaped groove, such as a U-shaped groove or a C-shaped groove. Therefore, each member attached to the wheel-well cover is manufacturing tolerant.

The shape of the member attached to the wheel-well cover is such that it is capable of only pushing the pin and not pulling it.

According to one embodiment, the steering bracket is configured to be mounted on a wheel-hub of the wheel, opposite to the wheel-well cover. Therefore, the wheel is sandwiched between the wheel-well cover and the sliding linkage. More particularly, the wheel is sandwiched between the wheel-well cover and the steering member.

According to one embodiment, the steering bracket is configured to be centrally mounted on the wheel-hub.

According to one embodiment, the slots are disposed on a L-shaped lug attached to each end of the steering bracket.

The L-shaped lug is preferably disposed in a plane transversally to the wheel-well cover.

According to one embodiment, the steering bracket is in one piece.

According to one embodiment, each pin comprises a locking inner pin.

The locking inner pin can be a shoulder sandwiching the walls of the respective slot in order to avoid a sliding of each pin perpendicular to the steering bracket.

According to one embodiment, the vehicle body on which the pivotal linkage is configured to be mounted is a wheel-arch.

According to a second aspect of the invention, these and other objectives are achieved by a vehicle comprising a drag reducing device as previously described.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

In this document, "vehicle" means any of a vehicle of a passenger car type, such as a car, a van, a panel van, or a light truck, a vehicle used for transporting items and goods, such as a truck or a semitrailer, and a vehicle for transporting people, such as a bus.

Figure 2:
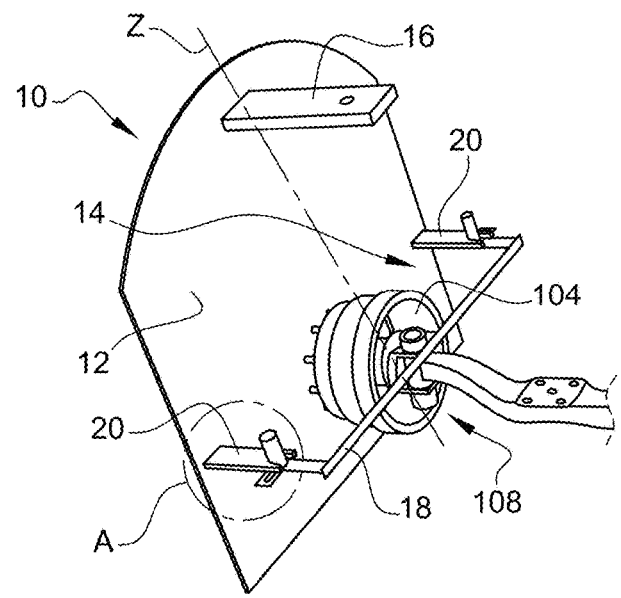
FIG. 2 is a schematic perspective view of a drag reducing device according to an embodiment of the invention, mounted on an element of unsprung masses of a motor vehicle.
Figure 3:
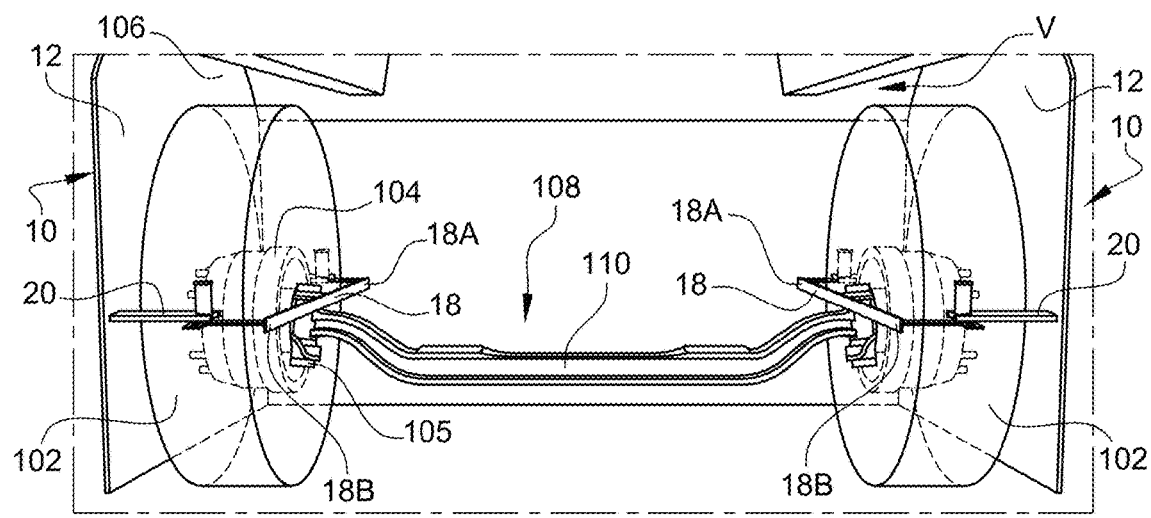
FIG. 3 is a schematic perspective view of a front axle of a vehicle, provided with drag reducing devices of FIG. 2.
Figure 4:
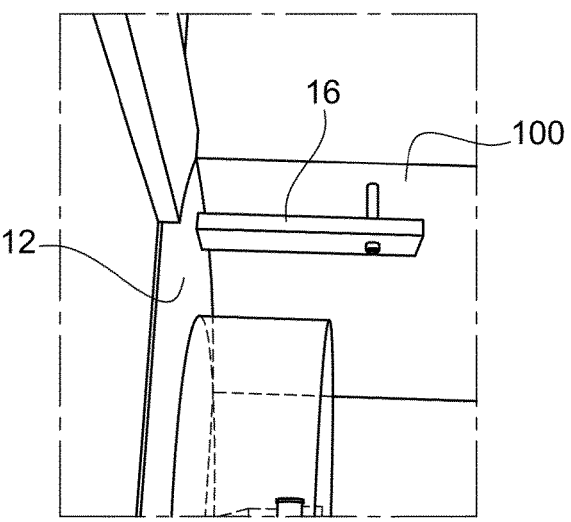
FIG. 4 is a schematic perspective view illustrating the pivotal linkage between the wheel-well cover and the wheel-arch of FIG. 2.
Figure 5:
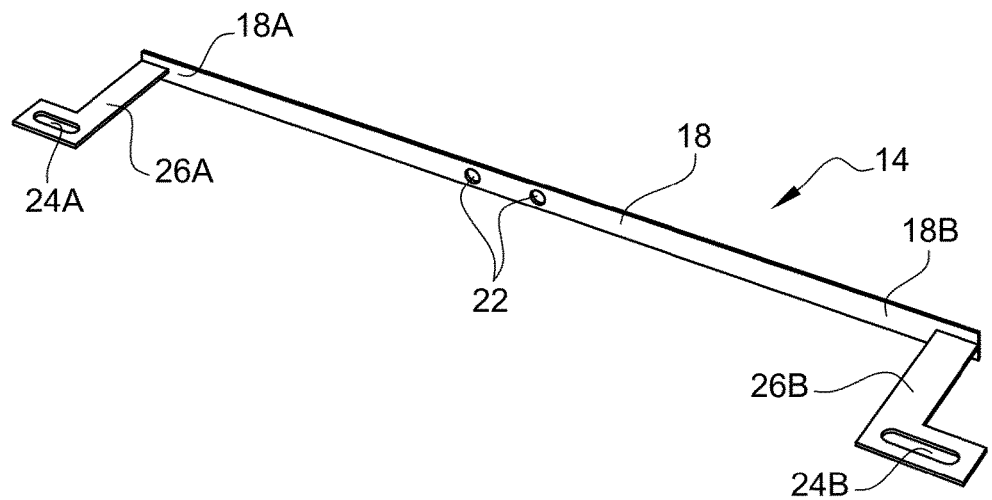
FIG. 5 is a schematic perspective view of a steering bracket of the drag reducing device of FIG. 2.

FIGS. 2 to 4 show a drag reducing device 10 according to an embodiment of the invention, mounted on sub component 108 of unsprung masses associated with a wheel 102 of a motor vehicle V.

More precisely, FIG. 3 shows a vehicle front axle 108. The front axle 108 is suitably comprised of an axle shaft 110 and two wheel-hubs 104 mounted at each end of the axle shaft 110. A wheel 102 is secured onto each wheel hubs 104. The wheel hubs 104 are rotatably connected to the axle shaft 110 and therefore can steer the vehicle. Wheels 102, wheel hubs 104 and other components such as suspension links, springs, schock absorbers, form the vehicle unsprung mass which is provided with the general reference number 108.

The vehicle front axle 108 is secured on the vehicle body. Each wheel 102 is fitted with a drag reducing device 10.

The drag reducing device 10 comprises a wheel-well cover 12 that externally covers the wheel-well 106 and the wheel 108, a pivotal linkage 16 (FIG. 4) pivotally connecting the wheel-well cover 12 to the wheel-arch 100, and a sliding linkage 14 slidingly connecting the wheel-well cover 12 to the wheel-hub 104.

The wheel-arch 100 (FIG. 1) is therefore connected to (i) the vehicle body which forms the vehicle sprung mass, and to (ii) the wheel-hub 104 which is an element of unsprung masses associated the wheel 102.

Figure 9:
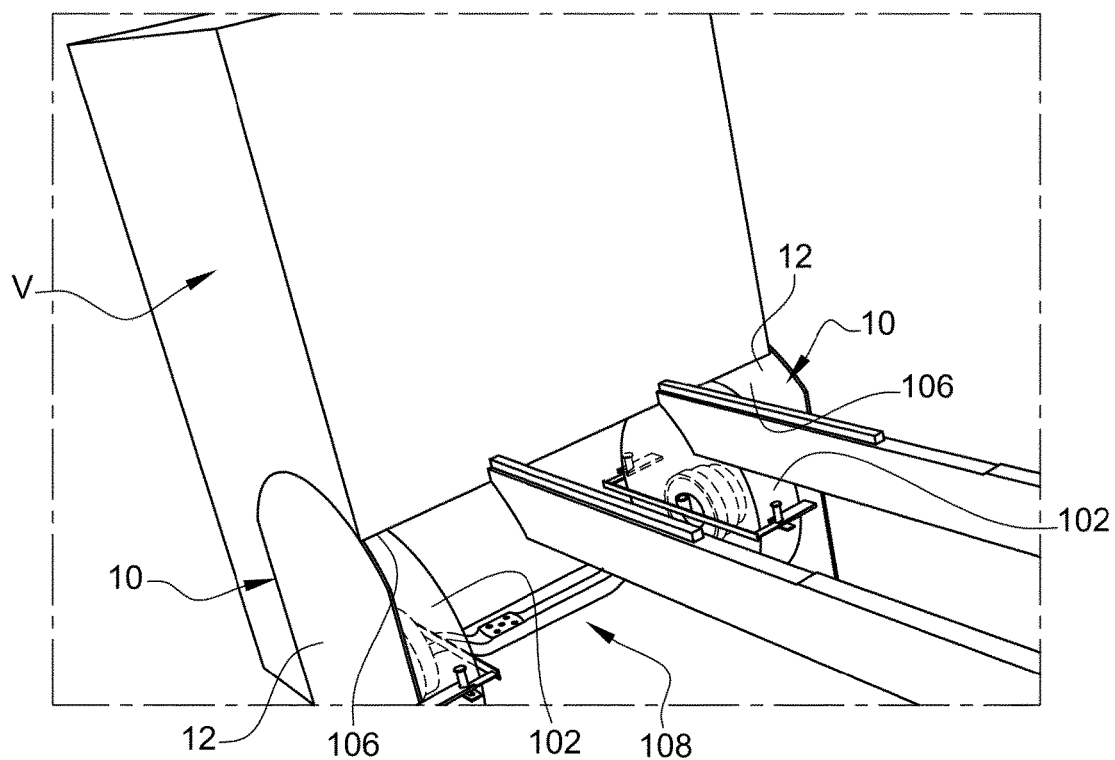
FIG. 9 is a schematic perspective view of a truck with drag reducing devices of FIG. 2, and FIGS. 10 and 11 are schematic view illustrating the mechanism of the drag reducing device of FIG. 2.

The wheel-well cover 12 can preferably cover the entire wheel 102 and the wheel-well 108, as shown in FIG. 9.

In the illustrated embodiment, the sliding linkage 14 comprises a steering bracket 18 mounted on the wheel-hub 104 perpendicular to a steering axis Z of the wheel 102, and two members 20 attached to the wheel-well cover 12 and configured to cooperate with the steering bracket 18, as described with regard to FIGS. 5 to 8. As it will apparent, the steering bracket 18 makes it possible to rotate the wheel-well cover 12, so that the wheel-well cover 12 follows the wheel 102, along a steering axis Z, as described with regard to FIGS. 10 and 11.

As illustrated in FIG. 4, the pivotal linkage 16 rotatably links the wheel-well cover 12 on the wheel arch 100.

The steering bracket 18 can be centrally mounted on the wheel-hub 104, as illustrated in FIGS. 2 and 3, and preferably the steering bracket 18 can be mounted on a knuckle joint 105 disposed on the wheel-hub 104. The steering bracket 18 can be mounted on the wheel-hub 104, opposite to the wheel-well cover 12. The steering bracket 18 of FIG. 3 extends radially from the wheel 102 and is arranged transversally to the axle shaft 110.

The members 20 attached to the wheel-well cover 12 can be molded with the wheel-well cover 12 or attached to the wheel-well cover 12.

Turning to FIGS. 5 to 8, the steering bracket 18 can comprise two mounting holes 22, preferably arranged in the center of the steering bracket 18, in order to secure the steering bracket 18 on the wheel-hub 104 by means of screws.

Moreover, the steering bracket 18 comprises a front end 18A and a rear end 18B; and two longitudinal slots, respectively a front slot 24A and a rear slot 24B, which can be arranged at each end 18A, 18B of the steering bracket 18.

Each slot 24A, 24B can be arranged on a lug, respectively a front lug 26A and a rear lug 26B. The front lug 26A and the rear lug 26B are preferably L-shaped. They are secured to each end of the steering bracket 18. The front lug 26A and the rear lug 26B can be disposed in a plane transversally to the wheel-well cover 12. Preferably, the steering bracket 18 and front lug 26A and the rear lug 26B are in one piece.

Each slot 24A, 24B is provided with a pin, respectively a front pin 28A and a rear pin 28B, which can be slidably mounted therein along the longitudinal direction of the slot. To this end, each pin 28A, 28B can comprise a locking inner pin 30. The locking inner pin 30 can be two shoulders 30A, 30B sandwiching the walls of the respective slot 24A, 24B, in order to avoid a sliding of each pin 28A, 28B perpendicular to the steering bracket.

Each pin 28A, 28B is configured to cooperate with one member 20 attached to the wheel-well cover 12 in order to transfer a steering input to the wheel-well cover 12. Each member 20 attached to the wheel-well cover 12 comprises a proximal end 20A attached to the wheel-well cover 12 and a distal end 20B complementary of the respective pin 28A, 28B.

Figure 6:
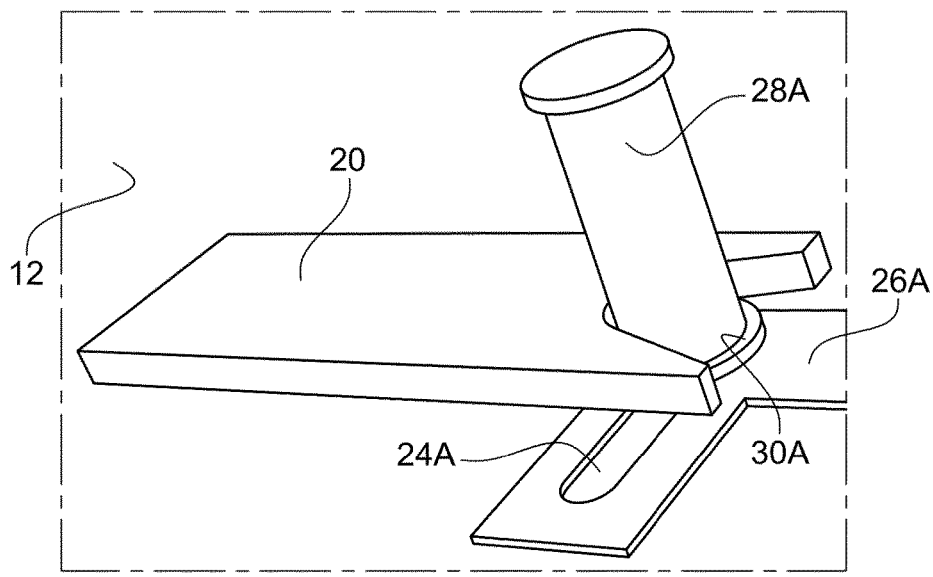
FIG. 6 is a detail view of zone A of FIG. 2.
Figure 7:
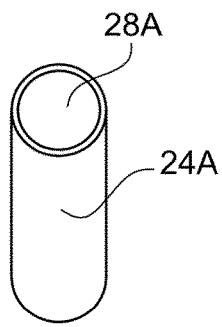
FIG. 7 is a schematic view from above of a slot with a pin of the drag reducing device of FIG. 2.
Figure 8:
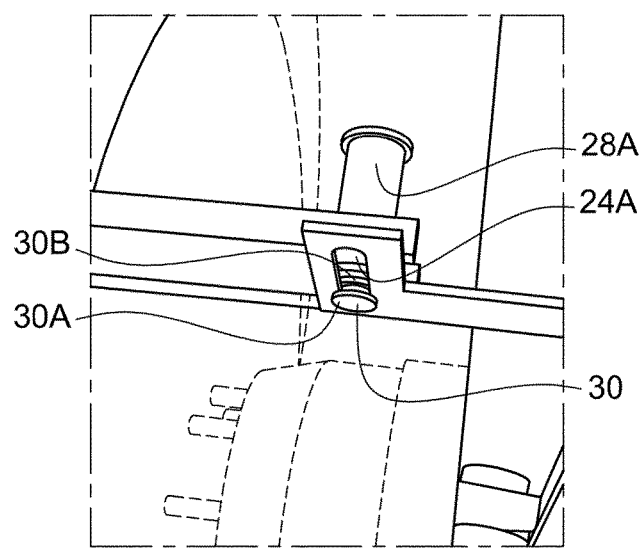
FIG. 8 is a schematic perspective view illustrating the locking inner pin of the pin of FIG. 7.

As illustrated in FIG. 6, each pin 28A, 28B can be cylindrical and the distal end 20B of the respective member 20 attached to the wheel-well cover 12, can comprise a concave groove, such as a C-shaped groove. The C-shaped members 20 are merely engaged on the pins 28 in other words, the drag reducing device 10 is biased against the pins 28. Thus, the drag reducing device 10 can be easily fitted or retrofitted on a vehicle as the members 20 engage into pins 28 which have an adjustable position within the slot 24 and therefore can absorb dimensional dispertion.

Each pin 28A, 28B preferably extends vertically, perpendicular to the steering bracket. Therefore, the complementary member 20 attached to the wheel-well cover 12, can slide vertically along the pin 28A, 28B, in order to accommodate vertical motion of the unsprung mass when the vehicle runs on bumps and road imperfections. Therefore, the drag reducing device 10 comprises means to absorb vertical motion of the wheels with regards to the motor vehicle body. Each pin 28A, 28B enables to connect the wheel-well cover 12 to the wheel-hub 104 with one degree of freedom oriented in the vertical movement of the wheel 102.

Figure 1:
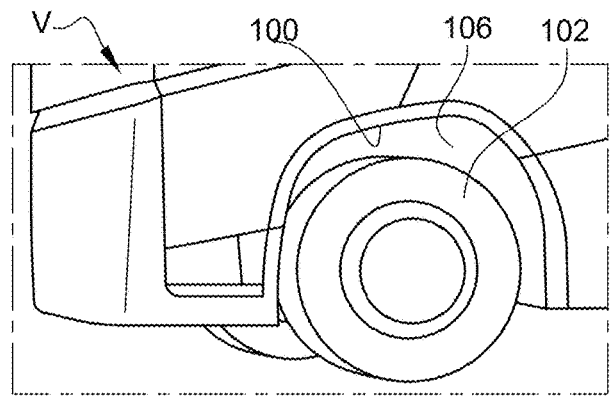
FIG. 1 is a view illustrating gap between wheel and wheel-arch of a motor vehicle of the prior art.

FIG. 9 illustrates the motor vehicle V of FIG. 1, fitted with two front drag reducing devices 10. Each wheel-well cover 12 can cover the entire wheel-well 106 of the respective front wheel 102. The wheel-well cover 12 is flush with the external body surface of the motor vehicle V when the wheels 12 are in neutral orientation. Therefore, the drag reducing device 10 significantly improves the aerodynamic profile of the motor vehicle V.

Figure 10:
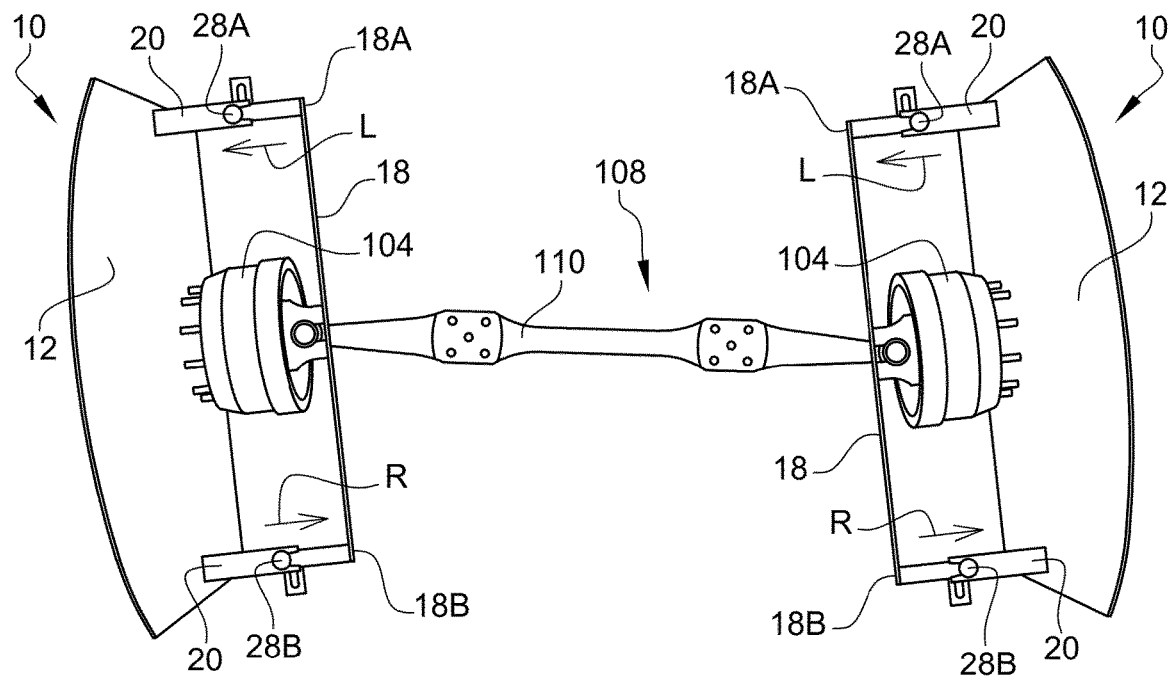
Figure 11:
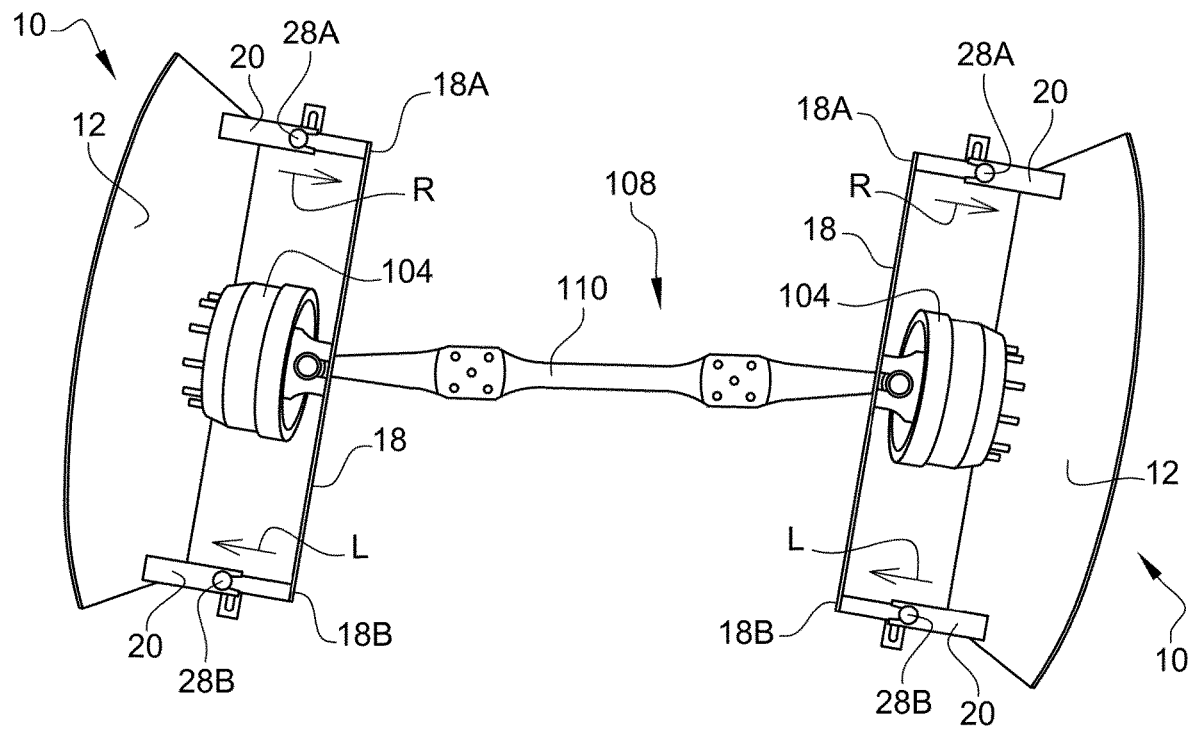

FIGS. 10 and 11 illustrate the mechanism of the drag reducing device 10 during cornering.

The steering bracket 18 is secured on the knuckle bracket and thus follows the steering motion of the front wheels 102 during cornering.

The wheel-hub 104 of each front wheel 102 is connected to a suitable steering mechanism achieve a right or left turning of the front wheels 102 of a motor vehicle V. Therefore, the steering bracket 18, which is connected to the wheel-hub 104 of a front wheel 102, can move along with the right or left turning of the front wheel 102.

As illustrated in FIG. 10, in case the motor vehicle V is entering a left turn, a left steering input is fed into each wheel-hub 104 through the axle shaft 110. Each wheel-hub 104 rotates towards the left. The steering bracket 18 of the left wheel 102 is pushed towards the left L in the front end 18A, via the front pin 28A, which transfers that input to the respective member 20 attached to the wheel-well cover 12. Therefore, the wheel-well cover 12 of the left wheel 102 rotates to the left with the same magnitude as the left wheel 102. The rear pin 28B of the left steering bracket 18 moves in the opposite direction R due to an input applied by the wheel-well cover 12, via the respective member 20 attached to the wheel-well cover 12.

Symmetrically, the steering bracket 18 of the right wheel 102 is pushed towards the right R in the rear end 18B, via the rear pin 28B, which transfer that force to the respective member 20 attached to the wheel-well cover 12. Therefore, the wheel-well cover 12 of the right wheel 102 rotates to the left with the same magnitude as the right wheel 102. The front pin 28B of the right steering bracket 18 moves in the opposite direction L due to an input applied by the wheel-well cover 12, via the respective member 20 attached to the wheel-well cover 12.

As illustrated in FIG. 11, in case the motor vehicle V is entering a right turn, a right steering input is fed into each wheel-hub 104 through the axle shaft 110. Each wheel-hub 104 rotates towards the right. The steering bracket 18 of the right wheel 102 is pushed towards the right R in the front end 18A, via the front pin 28A, which transfers that input to the respective member 20 attached to the wheel-well cover 12. Therefore, the wheel-well cover 12 of the right wheel 102 rotates to the right with the same magnitude as the right wheel 102. The rear pin 28B of the right steering bracket 18 moves in the opposite direction L due to an input applied by the wheel-well cover 12, via the respective member 20 attached to the wheel-well cover 12.

Symmetrically, the steering bracket 18 of the left wheel 102 is pushed towards the left L in the rear end 18B, via the rear pin 28B, which transfers that force to the respective member 20 attached to the wheel-well cover 12. Therefore, the wheel-well cover 12 of the left wheel 102 rotates to the right with the same magnitude as the left wheel 102.

Furthermore, the pins 28A, 28B can slide along the slots 24A, 24B parallel to the steering bracket 18, to achieve the turn. Each slot 24A, 24B is a guiding rail for the corresponding pin 28A, 28B.

Each slot 24A, 24B, pin 28A, 28B and member 20 attached to the wheel-well cover 12, is a guiding means for the wheel-well cover 12.

The drag reducing device of the present invention improves a vehicle aerodynamic drag in a simple and effective manner. The said drag reducing device is easy to assemble as it has minimal parts and does not need much human effort.

The invention claimed is:

1. A drag reducing device for a motor vehicle comprising a vehicle body and at least one substantially semi-circular wheel-well for receiving a wheel capable of vertical and rotational movements with regards to the vehicle body, the vehicle comprising unsprung masses associated with the at least one wheel:

the drag reducing device comprising: a wheel-well cover configured to cover at least a portion of the wheel and of the wheel-well, a pivotal linkage pivotally connecting the wheel-well cover to the vehicle body, and a sliding linkage slidingly connecting the wheel-well cover to an element of the unsprung masses with one degree of freedom oriented in the vertical movement of the at least one wheel;

the sliding linkage comprising a steering bracket configured to be mounted on the element of the unsprung masses perpendicular to a steering axis of the wheel, and two members attached to the wheel-well cover and configured to cooperate with the steering bracket; and the steering bracket comprising two longitudinal slots, each longitudinal slot being provided with a pin slidably mounted therein along a longitudinal direction of the longitudinal slot, wherein each pin is configured to cooperate with one member attached to the wheel-well cover allowing transfer of a steering input to the wheel-well cover.

2. The drag reducing device of claim 1, wherein each pin extends perpendicular to the steering bracket, and each member attached to the wheel-well cover comprises a complementary shaped end in order to slide along the pin perpendicular to the steering bracket.

3. The drag reducing device of claim 2, wherein each member attached to the wheel-well cover comprises a distal end with regard to the wheel well cover, wherein the distal end comprises a groove that allows each member attached to the wheel-well cover to slide over the pin perpendicular to the steering bracket.

4. The drag reducing device of claim 3, wherein the groove is a concave shaped groove.

5. The drag reducing device of claim 1, wherein the steering bracket is configured to be mounted on a wheel-hub of the wheel, opposite to the wheel-well cover.

6. The drag reducing device of claim 5, wherein the steering bracket is configured to be centrally mounted on the wheel-hub.

7. The drag reducing device of claim 1, wherein the longitudinal slots are disposed on a L-shaped lug attached to each end of the steering bracket.

8. The drag reducing device of claim 7, wherein each L-shaped lug is disposed in a plane transverse to the wheel-well cover.

9. The drag reducing device of claim 1, wherein the steering bracket is monolithic.

10. The drag reducing device of claim 1, wherein each pin comprises a locking inner pin.

11. The drag reducing device of claim 10, wherein the locking inner pin is a shoulder sandwiching walls of a respective longitudinal slot in order to avoid a sliding of each pin perpendicular to the steering bracket.

12. The drag reducing device of claim 11, wherein the vehicle body on which the pivotal linkage is configured to be mounted is a wheel-arch.

13. A vehicle comprising the drag reducing device of claim 1.

14. The drag reducing device of claim 4, wherein the concave shaped groove is a U-shaped groove or a C-shaped groove.

* * * * *